(12) United States Patent
Los

(10) Patent No.: US 9,015,604 B2
(45) Date of Patent: Apr. 21, 2015

(54) CALENDARING BETWEEN USER PROFILES

(71) Applicant: Microsoft Corporation, Redmond, WA (US)

(72) Inventor: David J. Los, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 13/685,701

(22) Filed: Nov. 26, 2012

(65) Prior Publication Data

US 2014/0149886 A1 May 29, 2014

(51) Int. Cl.
*G06F 3/048* (2013.01)
*G06F 17/30* (2006.01)
*G06F 3/0481* (2013.01)
*G06Q 10/10* (2012.01)

(52) U.S. Cl.
CPC ........ *G06F 17/30598* (2013.01); *G06F 3/0481* (2013.01); *G06Q 10/1093* (2013.01)

(58) Field of Classification Search
CPC ......... G06Q 10/10; G06F 3/0481; H04N 7/15
USPC .................................................. 715/753, 963
See application file for complete search history.

(56) References Cited

U.S. PATENT DOCUMENTS

| | | | |
|---|---|---|---|
| 5,960,406 | A | 9/1999 | Rasansky et al. |
| 6,369,840 | B1 | 4/2002 | Barnett et al. |
| 6,480,885 | B1 | 11/2002 | Olivier |
| 7,035,913 | B2 | 4/2006 | Culp et al. |
| 7,188,073 | B1 | 3/2007 | Tam et al. |
| 7,620,902 | B2 * | 11/2009 | Manion et al. ............... 715/758 |
| 7,679,518 | B1 | 3/2010 | Pabla et al. |
| 7,721,224 | B2 * | 5/2010 | Sellen et al. ................. 715/804 |
| 7,870,194 | B2 | 1/2011 | Michel et al. |

(Continued)

FOREIGN PATENT DOCUMENTS

| | | |
|---|---|---|
| JP | 2012-103868 A | 5/2012 |
| KR | 2002-0092730 A | 12/2002 |
| KR | 2003-0079837 A | 10/2003 |

OTHER PUBLICATIONS

Tullio, et al., "Augmenting Shared Personal Calendars", Retrieved at <<http://citeseerx.ist.psu.edu/viewdoc/download?doi=10.1.1.66. 518&rep=rep1&type=pdf>>, In the proceedings of the 15th annual ACM symposium on User interface software and technology, Oct. 27, 2002, pp. 10.

(Continued)

*Primary Examiner* — David Phantana Angkool
(74) *Attorney, Agent, or Firm* — Louise Bowman; Jim Ross; Micky Minhas

(57) ABSTRACT

Calendar items can be scheduled with a joined group of user profiles. Scheduling calendar items can include, for each of the calendar items, sending a calendar item request to each of the user profiles in the group of user profiles. In response to the joining of a new user profile to the group, the new user profile can be automatically sent a calendar item request for each of one or more of the calendar items scheduled with the group of user profiles. Also, a first user profile can receive a request to share a calendar with a second user profile. The request can be received from the second user profile and can list one or more additional user profiles as recipients of the request. A representation of the request to share can include a control that can be selected to share the calendar with the additional user profile(s).

20 Claims, 7 Drawing Sheets

(56) References Cited

U.S. PATENT DOCUMENTS

| | | | |
|---|---|---|---|
| 8,122,362 B2 | 2/2012 | Brush et al. | |
| 8,161,069 B1* | 4/2012 | Wilder et al. | 707/783 |
| 8,359,538 B2* | 1/2013 | Jyrinki | 715/733 |
| 8,478,622 B2* | 7/2013 | Grodum | 705/7.12 |
| 8,612,876 B2* | 12/2013 | Barnett et al. | 715/767 |
| 8,688,779 B2* | 4/2014 | Bocking et al. | 709/204 |
| 8,719,717 B2* | 5/2014 | Kalu | 715/763 |
| 2006/0045029 A1 | 3/2006 | Ethier et al. | |
| 2007/0168447 A1 | 7/2007 | Chen et al. | |
| 2011/0271206 A1* | 11/2011 | Jones et al. | 715/753 |
| 2012/0158935 A1 | 6/2012 | Kishimoto et al. | |
| 2013/0211980 A1* | 8/2013 | Heiferman et al. | 705/30 |
| 2013/0212494 A1* | 8/2013 | Heiferman et al. | 715/753 |
| 2013/0263020 A1* | 10/2013 | Heiferman et al. | 715/753 |
| 2013/0298037 A1* | 11/2013 | Matthews et al. | 715/753 |
| 2014/0074629 A1* | 3/2014 | Rathod | 705/14.73 |
| 2014/0082536 A1* | 3/2014 | Costa et al. | 715/765 |
| 2014/0237053 A1* | 8/2014 | Abhyanker | 709/204 |

OTHER PUBLICATIONS

"Share Your Calendar Information", Retrieved at <<http://www.office.microsoft.com/en-us/outlook-help/share-your-calendar-information-HA001230249.aspx>>, Retrieved Date: Nov. 9, 2012, pp. 8.

International Search Report & Written Opinion for PCT Patent Application No. PCT/US2013/071223, Mailed Date: Jul. 17, 2014, Filed Date: Nov. 21, 2013, 11 Pages.

* cited by examiner

CALENDARING BETWEEN USER PROFILES

BACKGROUND

Computer users often work in teams. It can be useful for the teams to be able to share calendar information. For example, the users in teams often provide user input to send other team members calendar item requests, such as meeting requests that can be accepted or declined, or possibly tentatively accepted. Within computer systems such calendar item requests can be considered to be sent from one user's user profile to the other user's user profile, where the user profiles are data structures stored within computer systems. For example, such a calendar item request may be sent from one computing machine that is logged into a system or application with one user profile to one or more other computing machines that are logged into a system or application with one or more other user profiles. As another example, a user profile for one team member may share a calendar (such as a personal calendar or a group calendar) with one or more other user profiles for other team members, providing those other user profile(s) with access to the calendar.

SUMMARY

The tools and techniques discussed herein relate to calendaring between user profiles, such as providing calendaring information to user profiles for members of a team. For example, when a team member joins a team, a user profile for that team member may be joined to a user profile group for the team, such as by adding the user profile to a group definition (e.g., a distribution list or some other data structure that indicates which user profiles are included in the group) for the team. Similarly, when a team member leaves a team, a user profile for that team member may be removed from the user profile group for the team. As will be discussed herein, the joining of a user profile to the group may trigger one or more automatic responses. For example, the automatic response(s) may include initiating the sharing with the newly-joined user profile of one or more calendars associated with the group, such as personal calendars of the other user profiles in the group and/or a group calendar for the group. As another example, the automatic response(s) may include sending one or more calendar item invitations to the newly-joined user profile, which can allow calendar items applying to the group to be included on the newly-joined user profile's calendar. Additionally, when a user profile is removed from the group, that removal may yield one or more automatic responses. For example, termination of that removed user profile's calendar sharing with the group may be automatically initiated upon removal of the user profile from the group. As another example, removal of calendar items related to the group from that user profile's calendar may be automatically initiated upon removal of the user profile from the group. Also, the tools and techniques may include facilitating calendar sharing requests to be initiated in response to user input, such as user input from a team member that is to gain access to the shared calendar information.

In one embodiment, the tools and techniques can include scheduling calendar items with a joined group of user profiles. Scheduling calendar items can include, for each of the calendar items, sending a calendar item request to each of the user profiles in the group of user profiles. A new user profile can be joined to the group of user profiles. In response to the joining of the new user profile to the group, the new user profile can be automatically sent a calendar item request for each of one or more of the calendar items scheduled with the group of user profiles.

In another embodiment of the tools and techniques, a first user profile can receive a request to share a digital calendar with a second user profile. The request can be received from the second user profile and can list one or more additional user profiles as recipients of the request to share. The additional user profile(s) can be one or more user profiles other than the first user profile or the second user profile. A representation of the request to share can be displayed. The representation can include a control that can be selected to share the calendar with the additional user profile(s). User input selecting the control and indicating that the calendar is to be shared with the additional user profile(s) can be received. Also, in response to receiving the user input selecting the control and indicating that the calendar is to be shared with the one or more additional user profiles, sharing of the calendar with the additional user profile(s) can be initiated and may be fully carried out to share the calendar with the additional user profile(s).

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
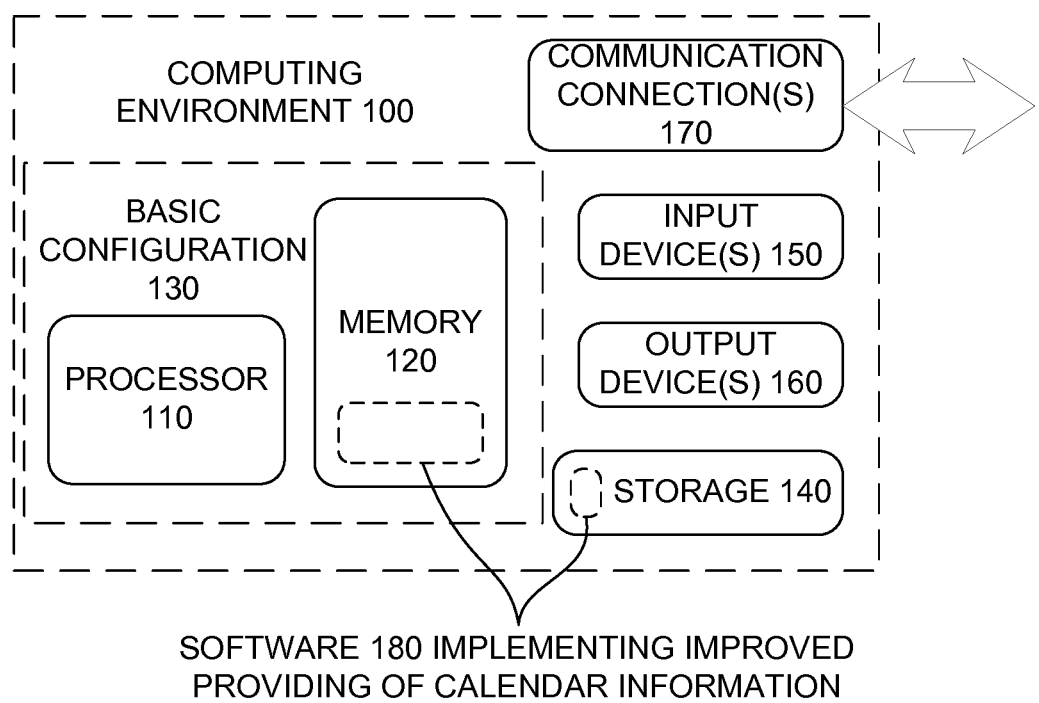
FIG. 1 is a block diagram of a suitable computing environment in which one or more of the described embodiments may be implemented.

Embodiments described herein are directed to techniques and tools for improved providing of calendar information between user profiles, such as user profiles of users working in teams. Such improvements may result from the use of various techniques and tools separately or in combination.

Such techniques and tools may include allowing calendar sharing among a group of user profiles. For example, a manager of a team may provide user input to share calendar information with user profiles for members of the team. For example, the user profiles may be included in a group by including the user profiles in a group definition, such as a distribution list. As new user profiles are joined to the group (e.g., by adding the new user profiles to the distribution list) the new user profiles can automatically receive calendar item requests and access to calendar items that are directed towards the group (e.g., by providing access to one or more calendars, such as a group calendar and/or personal calendars of group members). When user profiles are removed from the group, the removed user profiles' access to shared calendars can be revoked. Also, calendar items that are directed towards the group may be removed from the removed user profiles' calendars. The revocation of the shared access and the removal of calendar items may be initiated automatically upon the user profiles being removed from the group.

Additionally, a first user profile can send to a second user profile a request to share a digital calendar with the first user profile (i.e., a request for the first user to receive access to the digital calendar). The second user profile can grant the request (e.g., by user input provided by a user that is logged in using the second user profile), thereby initiating sharing of the calendar with the first user profile, which sharing can provide the first user profile with access to the calendar. As an example, the user input to grant the request may include a single user input action, such as user input selecting a displayed user interface control such as a button.

Accordingly, one or more substantial benefits can be realized from the tools and techniques described herein. For example, by automating the sharing of calendars and/or the removal or inclusion of calendar items for user profiles that are joined with or removed from a group, the work of a manager in bringing in new team members for a team associated with the group or removing team members from the team can be reduced. Other efficiencies may also be produced. For example, allowing a user profile to send a request for calendar sharing that can be granted to share a calendar (or even group of calendars) with that user profile and/or other user profiles that are recipients of the request can provide for more efficient initiation of calendar sharing in some situations. For example, such a calendar sharing request may allow a user granting such a request to do so with a single user input action.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a calendar server computing system and/or a calendar client computing system. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing improved calendaring between user profiles. An implementation of this improved calendaring between user profiles may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "identify," "schedule," "join," "remove," "send," "receive," "share," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. System and Environment for Calendaring Between User Profiles

Figure 2:
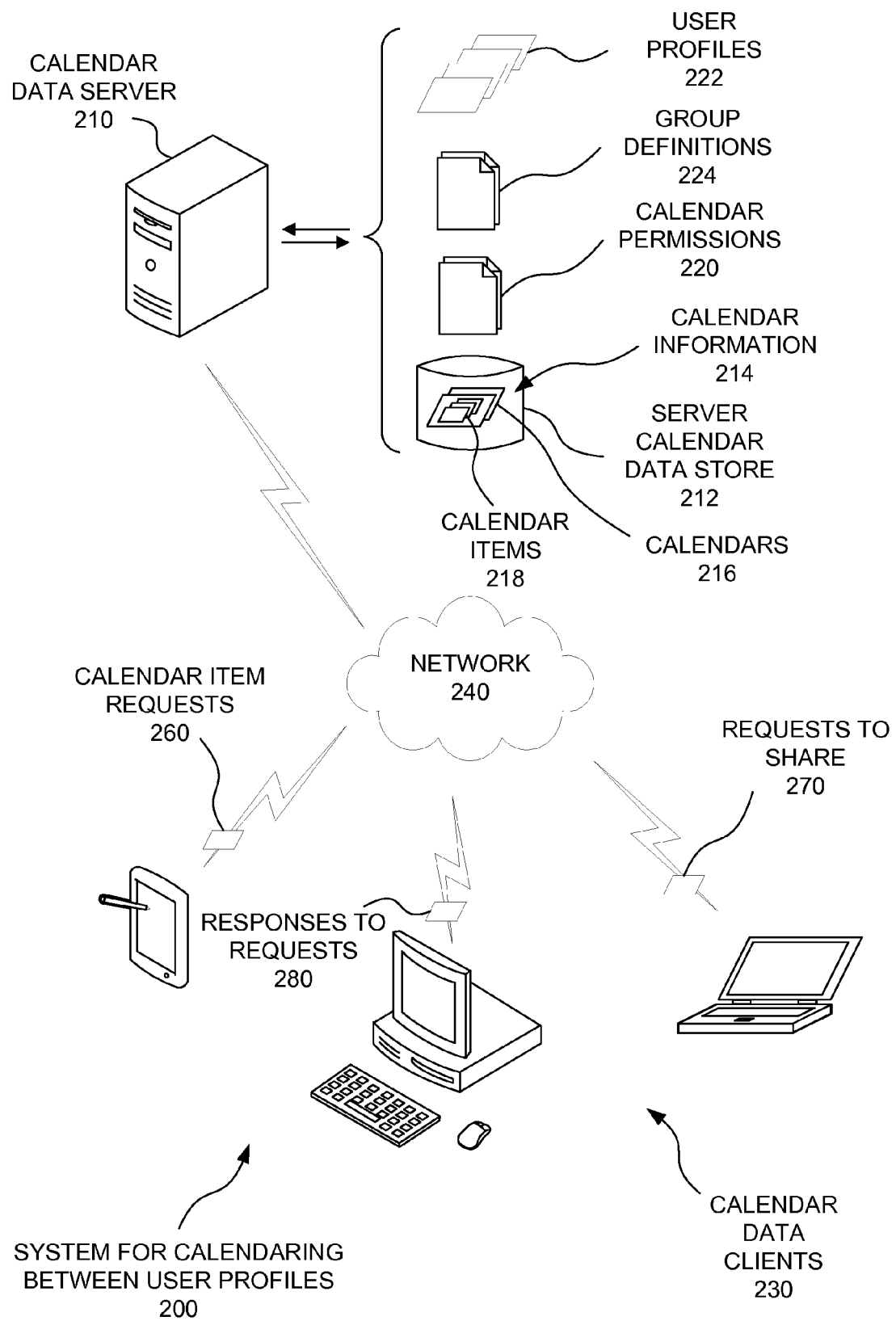
FIG. 2 is a schematic diagram of a computing environment or system for calendaring between user profiles.

FIG. 2 is a schematic diagram of an environment or system (200) for calendaring between user profiles in conjunction with which one or more of the described embodiments may be implemented. The system (200) can include a calendar data server (210), which can access and manage a server calendar data store (212). The server calendar data store (212) can include calendar information (214) (though it may also include other information such as e-mail information). The calendar information (214) can include one or more calendars (216), such as one or more personal calendars for a single user profile and/or one or more group calendars for groups of user profiles. Each of the calendars (216) can include calendar items (218), which are data structures representing information such as meeting information in the corresponding calendar (216).

The calendar data server (210) can also manage calendar permissions (220), which are data structures that indicate which user profiles (222) (such as individual user profiles (222) and/or or groups of user profiles (222)) can access each of the calendars (216). The calendar permissions (220) may indicate different types or levels of permissions for different user profiles (222) or groups of user profiles (222). The calendar data server (210) can also include group definitions (224), which can define groups of user profiles (222). The groups of user profiles (222) defined by the group definitions (224) may be granted calendar permissions (220) on a per-group basis. Groups of user profiles (222) may be used for other purposes, such as distributing messages such as requests to an entire group of user profiles (222), or taking other actions that apply to a whole group of user profiles. The calendar data server (210) can join user profiles (222) in a group by adding the user profiles (222) to a group definition (224). The data items (214, 216, 218, 222, and 224) may each be separate data structures, or they may be intermingled with each other and/or with other data items. The calendar data server (210) may also be a server for other types of information, such as e-mail information, etc.

The system (200) can include calendar data clients (230), which can be computer systems that can communicate with the calendar data server (210) through a computer network (240). The computer network (240) may include one or more of various different types of wired and/or wireless computer networks, such as local area networks, wide area networks, global computer networks, etc. The calendar data clients (230) can send calendar item requests (260), such as meeting requests, to other calendar data clients (230). Such calendar item requests may be sent directly and/or via the calendar data server (210). If a first calendar data client (230) is logged in to the calendar data server (210) with a first user profile (222), and that first calendar data client (230) sends a calendar item request (260) to a second user profile (222), the calendar item request (260) can be sent to the calendar data server (210). When another calendar data client (230) (or possibly even the first calendar data client (230)) is logged in with the second user profile (222), the calendar data server (210) can send the calendar item request (260) to that other calendar data client (230), possibly along with calendar information (214) and/or e-mail information associated with the second user profile (222). Also, the calendar data server (210) may automatically generate additional calendar item requests (260) for calendar items (218) that apply to a group of user profiles (222) (e.g., where the group was originally indicated as a recipient of the calendar item (218)), such as in response to a new user profile being added to a group definition (224). The calendar data server (210) can also send such calendar item requests to calendar data clients (230) that have logged in with the newly-added user profile (222).

The calendar data clients (230) can also send requests to share (270), which can be requests to share calendar information (214) with the sending user profile. Such requests to share (270) may be sent and received in the same manner as the calendar item requests (260), and/or in some other manner.

The calendar data clients (230) can also send responses (280) to the requests (260 and 270). Additionally, the calendar data clients (230) can display representations of the requests (260 and 270) and the responses (280), and may also display representations of the calendars (216) to which associated user profiles have appropriate calendar permissions (220). The calendar data clients (230) can provide such displays using output devices (such as the output devices (160) discussed above). Additionally, the calendar data clients (230) and/or the calendar data server (210) can include input devices, such as the types of input devices (150) discussed above, to receive user input, such as user input provided to edit the calendars (216), calendar permissions (220), group definitions (224), and/or user profiles (222), and to draft and edit requests (260 and 270) and responses (280).

Figure 3:
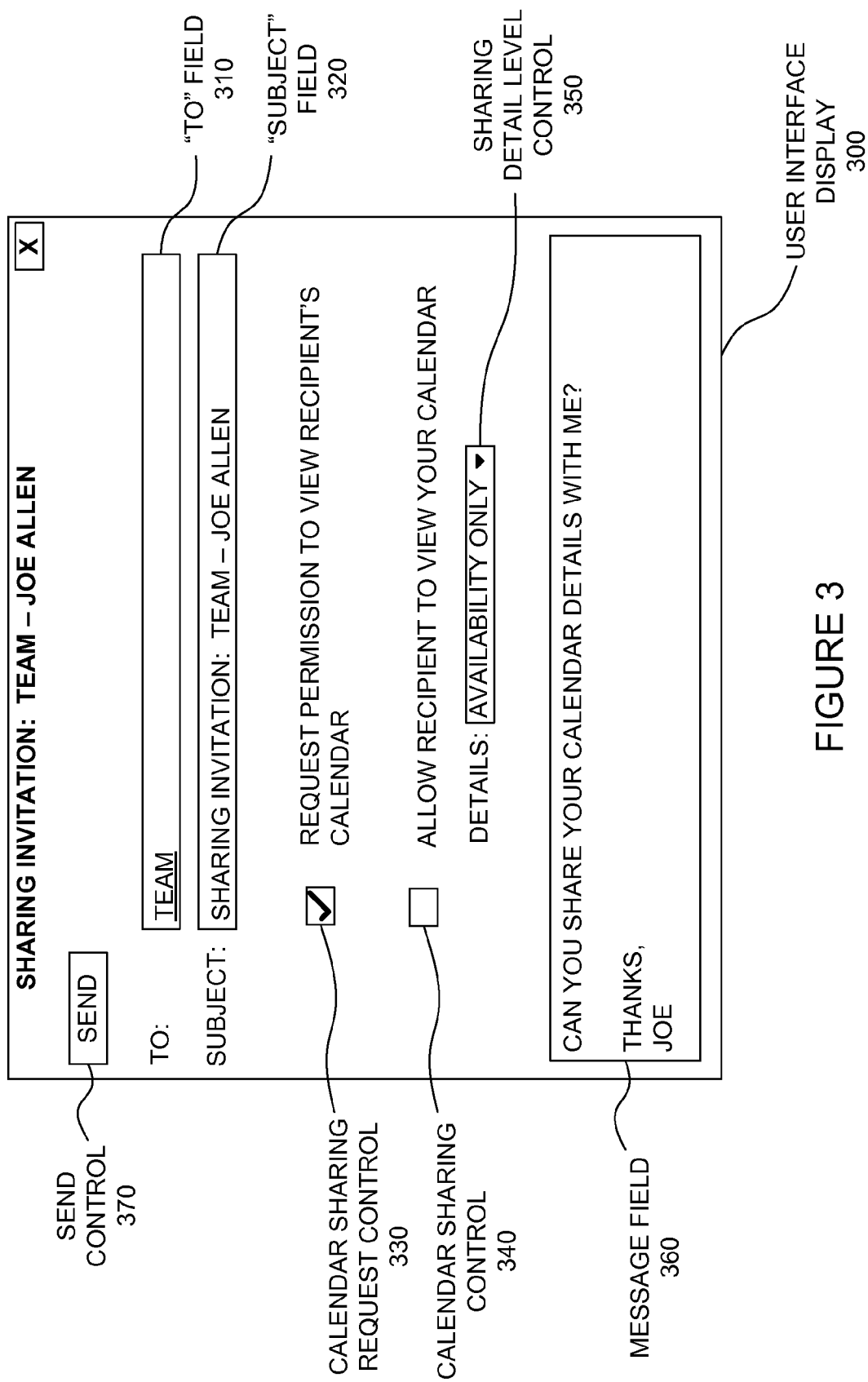
FIG. 3 is an illustration of an example of a user interface display for receiving user input to define a calendar share message.

III. Examples of User Interface Representations for Sharing Requests and Responses FIG. 3 illustrates an example of a user interface display (300) for receiving user input to define a calendar share message. The user interface display (300) can include a "TO" field (310), where text can be entered by user input to specify one or more recipients of the calendar share message. In the illustration, the label "TEAM" is entered in the "TO" field (310), which can indicate that the request to share is to be sent to all members of a user profile group labeled "TEAM", although labels (e.g., email addresses) for individual user profiles could be entered in the "TO" field in addition to or instead of such a group label. The user interface display (300) may also include a "SUBJECT" field (320) where text may be entered to indicate the subject of the calendar share message. The user interface display (300) can also include a calendar sharing request user interface control (330), which can be selected to indicate that the resulting calendar share message is to be a calendar sharing request, which can be sent to request that the sender be granted permission to access the calendar(s) of the recipient(s). In the example, the calendar sharing request user interface control (330) is a check box, although some other type of control could be used (a drop down menu, etc.). The user interface display (300) may also include a calendar sharing control (340), which can be selected to indicate that the calendar share message is to be a calendar sharing message, which can be sent to share the sender's calendar with the recipient(s). Also, user input can be provided at a sharing detail level control (350) to specify a level of calendar details to be shared if the calendar sharing control (340) is selected. The sharing detail level control (350) may be hidden or grayed-out if the calendar sharing control (340) is not currently selected. Additionally, the user interface display (300) can include a message field (360), where text for a message to the recipients of the calendar share message can be entered. The user interface display (300) can also include a message send user interface control (370), which may be in the form of a button or some other user interface control.

In the example, the calendar sharing request control (330) is selected and the calendar sharing control (340) is de-selected. Selection of the send control (370) with such a selection can send a request to share that has properties reflecting the selections on the user interface display (300), such as the requests to share (270) discussed above with reference to FIG. 2.

Figure 4:
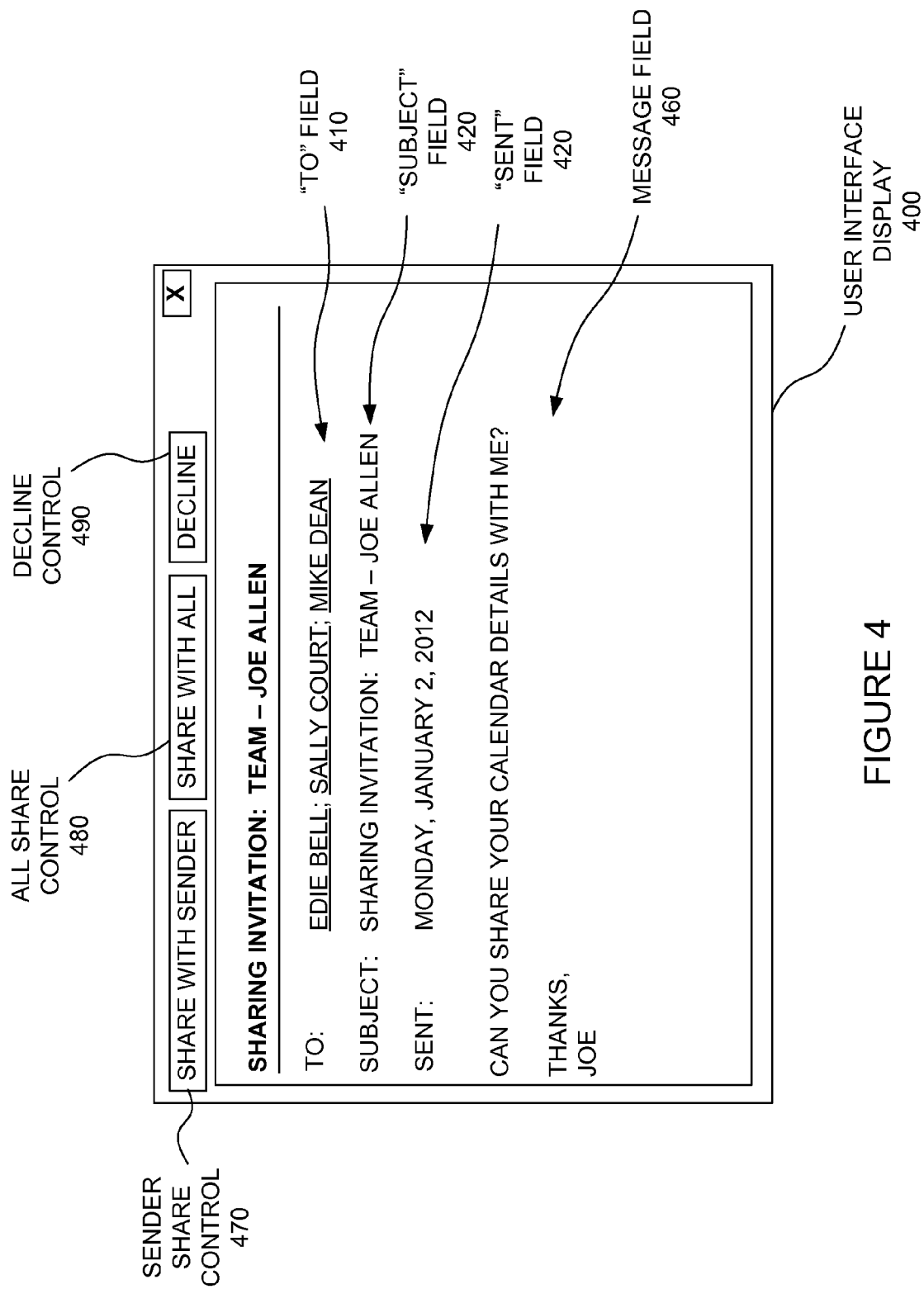
FIG. 4 is an illustration of an example of a user interface display for a received request to share resulting from selecting a send control in the user interface display of FIG. 3 to send a calendar sharing request.

Referring to FIG. 4, an example of a user interface display (400) for a received request to share is illustrated. The user interface display (400) can result from the request to share sent in response to selecting the send control (370) in the user interface display (300) of FIG. 3. The user interface display (400) can include a "TO" field (410) that can list the recipients of the request to share. In this example, the recipients are listed as the labels for the user profiles that belong to the user profile group with the label "TEAM" discussed above. Accordingly, the "TO" field (410) reads, "EDIE BELL; SALLY COURT; MIKE DEAN". Alternatively, the "TO" field (410) could read "TEAM" to indicate the group labeled "TEAM" is the recipient. The user interface display (400) also includes a "SUBJECT" field (420), a "SENT" field (420) indicating a time when the request to share was sent, and a message filed (460).

Additionally, the user interface display (400) can include user interface controls for receiving user input to indicate a response to the request to share. For example, the user interface display (400) can include a sender share control (470), which can be selected to share the recipient's calendar with just the sender of the request to share (here, "JOE ALLEN"). The user interface display (400) can also include an all share control (480) that can be selected to share the recipient's calendar with the sender of the request to share, and with all other recipients of the request to share. For example, if the user interface display (400) is being displayed for EDIE BELL, then selecting the all share control (480) can result in EDIE BELL's calendar being shared with the sender JOE ALLEN and with the other recipients SALLY COURT and MIKE DEAN. The user interface display (400) can also include a decline control (490), which can be selected by user input to decline to share the recipient's calendar in response to the request to share.

In the example, the controls (470, 480, and 490) for responding to the request to share are buttons. However, other controls may be used for responding to the request to share.

For example, sharing with the sender, sharing with all, and declining the request could all be listed as menu options in a drop-down menu in the user interface display (400). As another example, the user interface display (400) could include an additional button for sharing with the other recipients of the request to share, without sharing with the sender. Additionally, options may be provided to allow user input to select a level of detail to share. For example, the user interface display (400) may include a drop-down menu for selecting a level of detail to share (e.g., full details, availability only, or limited details (which may include, for example, subjects of calendar items in addition to availability)). Alternatively, controls for selecting such details could appear in a pop-up dialog that is surfaced after selection of one of the share controls (470 or 480) to initiate sharing of the recipient's calendar.

IV. Techniques for Calendaring Between User Profiles

Several techniques for calendaring between user profiles will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques discussed below may be performed at least in part by hardware logic.

Figure 5:
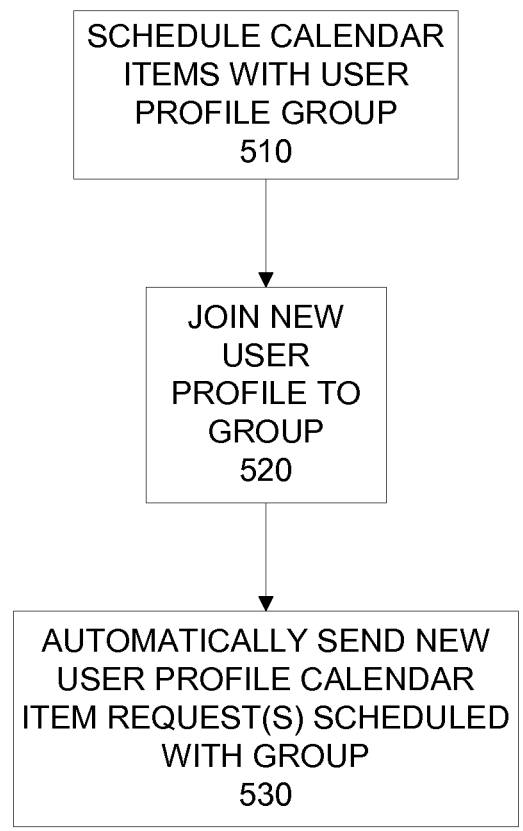
FIG. 5 is a flowchart of a technique for calendaring between user profiles.

Referring to FIG. 5, a technique for calendaring between user profiles will be discussed. The technique can include scheduling (510) calendar items with a joined group of user profiles. Scheduling the calendar items can include, for each of the calendar items, sending a calendar item request to each of the user profiles in the group of user profiles. A new user profile can be joined (520) to the group of user profiles. The technique can further include automatically sending (530) the new user profile a calendar item request for each of one or more of the calendar items scheduled with the group of user profiles. Automatically sending (530) the calendar item request(s) can be performed in response to joining the new user profile to the group of user profiles.

The technique of FIG. 5 can further include sharing group calendar information with the group of user profiles. Additionally, in response to joining the new user profile to the group of user profiles, the technique can include automatically providing the new user profile with access to the group calendar information.

The technique of FIG. 5 may further include, for each calendar item request for a calendar item of the one or more of the calendar items scheduled with the group of user profiles, automatically accepting the calendar item request and adding the calendar item to a calendar for the new user profile. The technique may include displaying a representation of each calendar item request, the representation including an acceptance user interface control that can be selected by user input to accept the calendar item request and add the calendar item to a calendar for the new user profile. The representation may further include a rejection user interface control that can be selected by user input to reject (or decline) the calendar item request and avoid adding the calendar item to a calendar for the new user profile. Also, the representation may include a tentative acceptance user interface control that can be selected by user input to tentatively accept the calendar item request and add the calendar item to a calendar for the new user profile.

The technique may further include, in response to joining (520) the new user profile to the group of user profiles, automatically sending a sharing invitation to the new user profile, the sharing invitation including information on accessing group calendar information for the group of user profiles. The sharing invitation may provide a control that can be selected by user input to share a personal calendar associated with the user profile. Also, the sharing invitation may provide an option (such as a control that can be selected to select the option) for sharing a personal calendar with a sender of the sharing invitation, and an option (such as a control that can be selected to select the option) for sharing the personal calendar with the group of user profiles.

In the technique of FIG. 5, the group of user profiles may be joined by inclusion in a group definition, such as a distribution list or some other data structure. Joining the new user profile to the group of user profiles can include adding the new user profile to the group definition.

The technique of FIG. 5 may include filtering the calendar items scheduled with the group of user profiles to yield a filtered set of one or more calendar items (e.g., the filtered set may exclude calendar items occurring in the past). Automatically sending (530) the new user profile a calendar item request for one or more of the calendar items scheduled with the group of user profiles can include automatically sending the new user profile a calendar item request for each of the calendar items in the filtered set of calendar items. Filtering the calendar items can include invoking a rule that excludes calendar items with scheduled times in the past.

The technique of FIG. 5 may include removing a user profile from the group of user profiles. In response to this removal, the technique may include automatically identifying calendar items scheduled with the group of user profiles in a calendar associated with the removed user profile, and removing the identified calendar items from the calendar associated with the removed user profile.

Figure 6:
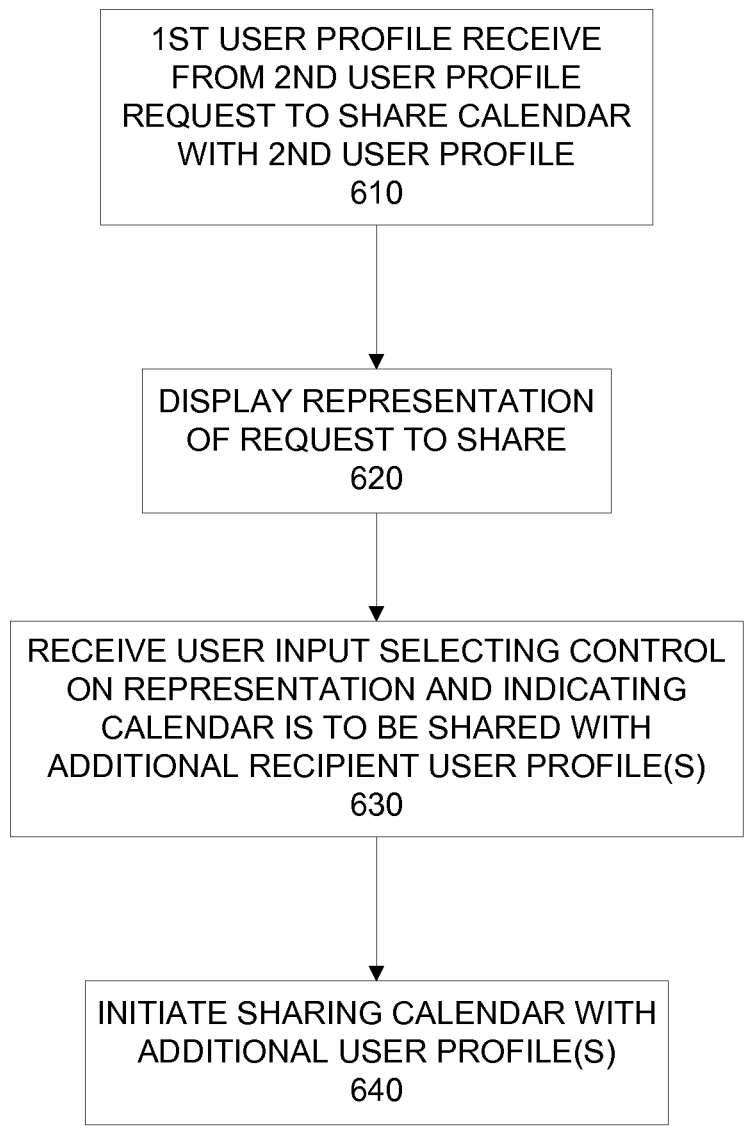
FIG. 6 is a flowchart of another technique for calendaring between user profiles.

Referring to FIG. 6, another technique for calendaring between user profiles will be discussed. The technique can include a first user profile receiving (610) from a second user profile a request to share a digital calendar (such as a personal calendar for the first user profile or a group calendar) with the second user profile. The request to share can list one or more additional user profiles as recipients of the request to share, where the additional user profile(s) can be user profile(s) other than the first user profile or the second user profile. For example, the user profile(s) may be listed separately and/or by listing one or more groups to which user profiles belong.

The FIG. 6 technique can include displaying (620) a representation of the request to share. The representation can include a control that can be selected to share the calendar with the one or more additional user profiles. User input selecting the control and indicating that the calendar is to be shared with the one or more additional user profiles can be received (630). The user input can be a single input action selecting the control, or multiple input actions. In response to receiving (630) the user input, sharing of the calendar with the one or more additional user profiles can be initiated (640).

Initiating (640) the sharing of the calendar can include automatically invoking a process to automatically share the calendar with the one or more additional user profiles. The user input selecting the control can indicate that the calendar is to be shared with the second user profile that sent the request and the additional user profile(s) that are recipients of the request. The technique may further include, in response to receiving (630) the user input, initiating sharing of the calendar with the second user profile.

Figure 7:
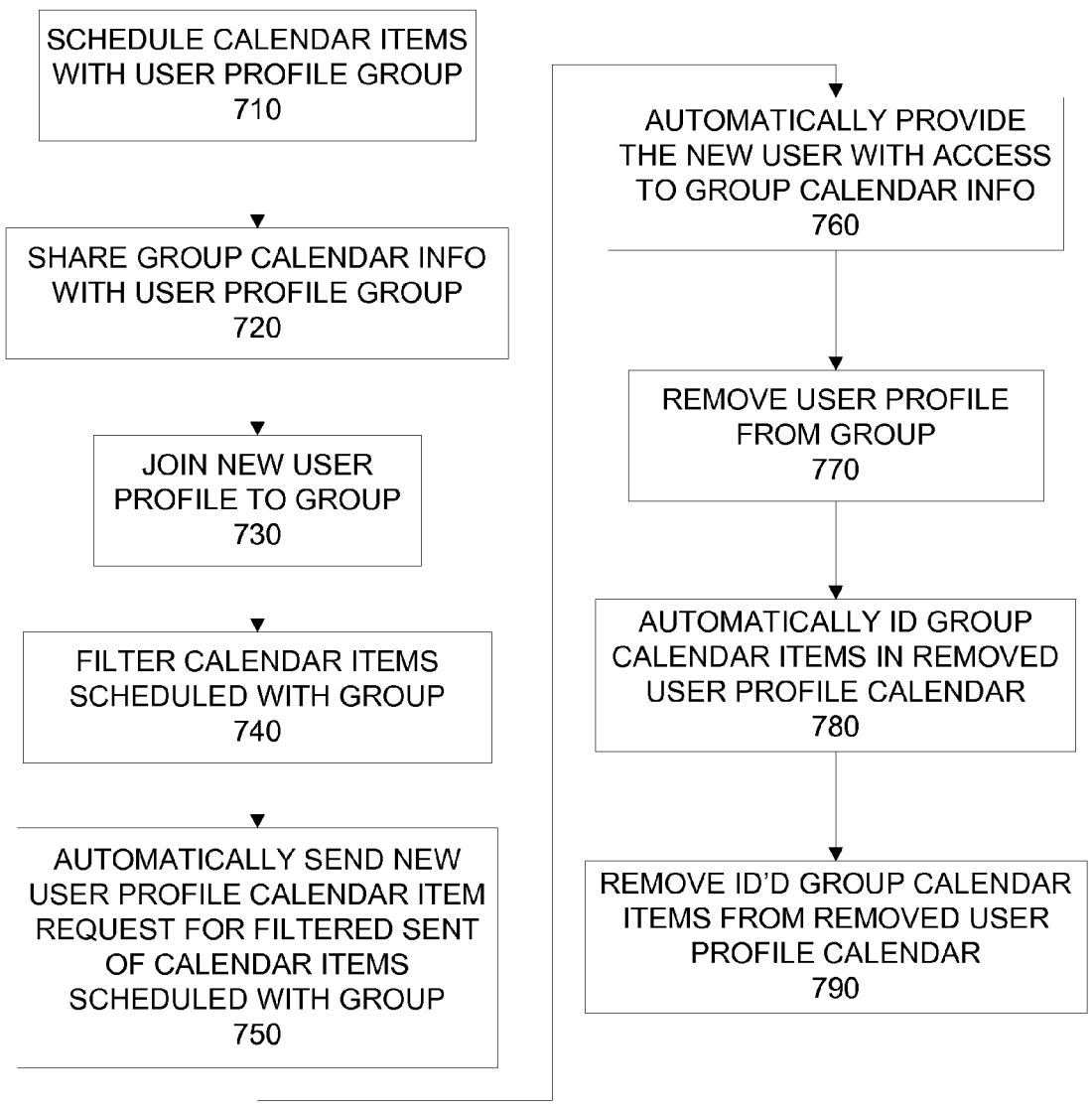
FIG. 7 is a flowchart of yet another technique for calendaring between user profiles.

Referring to FIG. 7, yet another technique for calendaring between user profiles will be discussed. The technique can include scheduling (710) calendar items with a joined group of user profiles. The group of user profiles can be joined by inclusion in a group definition. Scheduling (710) the calendar items can include, for each of the calendar items, sending a calendar item request to each of the user profiles in the group of user profiles. Group calendar information, such as a group calendar and/or personal calendars for user profiles in the group, can be shared (720) with the group of user profiles. A new user profile can be joined (730) to the group of user profiles by adding the new user profile to the group definition. The technique can further include filtering (740) the calendar items scheduled with the group of user profiles to yield a filtered set of one or more calendar items. In response to joining (730) the new user profile to the group of user profiles, the technique can include automatically sending (750) the new user profile a calendar item request for each of the calendar items in the filtered set of calendar items. In response to joining the new user profile to the group of user profiles, the new user profile can be automatically provided (760) with access to the group calendar information.

The FIG. 7 technique can further include removing (770) a user profile from the group of user profiles. In response to removing (770) the removed user profile, calendar items scheduled with the group of user profiles in a calendar associated with the removed user profile can be automatically identified (780) and removed (790) from the calendar associated with the removed user profile.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer-implemented method, comprising:
    scheduling computer-readable calendar items with a joined group of computer-readable user profiles, scheduling calendar items including, for each of the calendar items, sending a calendar item request to each of the user profiles in the group of user profiles;
    joining a new user profile to the group of user profiles;
    in response to joining the new user profile to the group of user profiles, automatically sending the new user profile a computer-readable calendar item request for each of one or more of the calendar items scheduled with the group of user profiles; and
    displaying a representation of each calendar item request, the representation including an acceptance user interface control that is configured to be selected by user input to accept the calendar item request and add the calendar item to a calendar for the new user profile, and the representation further including a rejection user interface control that is configured to be selected by user input to reject the calendar item request and avoid adding the calendar item to a calendar for the new user profile.

2. The method of claim 1, further comprising:
    sharing group calendar information with the group of user profiles; and
    in response to joining the new user profile to the group of user profiles, automatically providing the new user profile with access to the group calendar information.

3. The method of claim 1, further comprising, for each calendar item request for a calendar item of the one or more of the calendar items scheduled with the group of user profiles, automatically accepting the calendar item request and adding the calendar item to a calendar for the new user profile.

4. The method of claim 1, wherein the representation further includes a tentative acceptance user interface control that can be selected by user input to tentatively accept the calendar item request and add the calendar item to a calendar for the new user profile.

5. The method of claim 1, further comprising, in response to joining the new user profile to the group of user profiles, automatically sending a sharing invitation to the new user profile, the sharing invitation comprising information on accessing group calendar information for the group of user profiles.

6. The method of claim 5, wherein the sharing invitation provides a control that can be selected by user input to share a personal calendar associated with the user profile.

7. The method of claim 6, wherein the sharing invitation provides an option for sharing the personal calendar with a sender of the sharing invitation, and an option for sharing the personal calendar with the group of user profiles.

8. The method of claim 1, wherein the group of user profiles are joined by inclusion in a group definition, and wherein joining the new user profile to the group of user profiles comprises adding the new user profile to the group definition.

9. The method of claim 1, further comprising filtering the calendar items scheduled with the group of user profiles to yield a filtered set of one or more calendar items, wherein automatically sending the new user profile a calendar item request for one or more of the calendar items scheduled with the group of user profiles comprises automatically sending the new user profile a calendar item request for each of the calendar items in the filtered set of calendar items.

10. The method of claim 9, wherein filtering the calendar items comprises invoking a rule that excludes calendar items with scheduled times in the past.

11. The method of claim 1, further comprising removing a user profile from the group of user profiles, and in response to removing the removed user profile, performing the following:
    automatically identifying calendar items scheduled with the group of user profiles in a calendar associated with the removed user profile; and
    removing the identified calendar items from the calendar associated with the removed user profile.

12. The method of claim 1, wherein the method is performed at least in part by hardware logic.

13. A computer system comprising:
    at least one processor; and
    memory comprising instructions stored thereon that when executed by at least one processor cause at least one processor to perform acts comprising:
        a first user profile receiving from a second user profile a request to share a digital calendar with the second user profile, the request to share listing one or more additional user profiles as recipients of the request to share, the one or more additional user profiles being one or more user profiles other than the first user profile or the second user profile;
        displaying a representation of the request to share, the representation including a control that can be selected to share the calendar with the one or more additional user profiles;
        receiving user input selecting the control and indicating that the calendar is to be shared with the one or more additional user profiles; and in response to receiving the user input selecting the control and indicating that the calendar is to be shared with the one or more additional user profiles, initiating sharing of the calendar with the one or more additional user profiles.

14. The computer system of claim 13, wherein the user input is a single input action selecting the control.

15. The computer system of claim 13, wherein initiating the sharing of the calendar comprises automatically invoking a process to automatically share the calendar with the one or more additional user profiles.

16. The computer system of claim 13, wherein the user input selecting the control indicates that the calendar is to be shared with the second user profile and the one or more additional user profiles, and wherein the acts further comprise, in response to receiving the user input, initiating sharing of the calendar with the second user profile.

17. The computer system of claim 13, wherein the calendar is a group calendar.

18. One or more computer-readable storage media having computer-executable instructions embodied thereon that, when executed by at least one processor, cause at least one processor to perform acts comprising:
    scheduling computer-readable calendar items with a joined group of computer-readable user profiles, scheduling calendar items including, for each of the calendar items, sending a calendar item request to each of the user profiles in the group of user profiles;
    joining a new user profile to the group of user profiles;
    filtering the calendar items scheduled with the group of user profiles to yield a filtered set of one or more calendar items; and
    in response to joining the new user profile to the group of user profiles, automatically sending the new user profile a computer-readable calendar item request for each of the calendar items in the filtered set of one or more calendar items.

19. The one or more computer-readable storage media of claim 18, wherein the group of user profiles is joined by inclusion in a computer-readable group definition, and wherein the new user profile is joined to the group of user profiles by adding the new user profile to the group definition.

20. The one or more computer-readable storage media of claim 18, wherein the acts further comprise the following:
    removing a user profile from the group of user profiles;
    in response to removing the removed user profile, automatically identifying calendar items scheduled with the group of user profiles in a calendar associated with the removed user profile; and
    in response to removing the removed user profile, removing the identified calendar items from the calendar associated with the removed user profile.

\* \* \* \* \*